Nov. 3, 1959 J. J. DE PAOLO 2,910,700
POWER OPERATED SECURING DEVICE
Filed Sept. 25, 1956
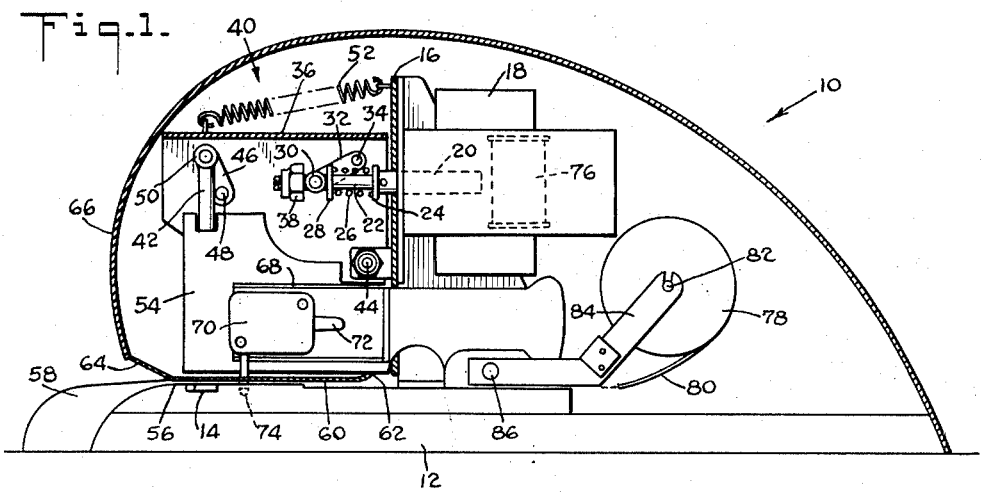
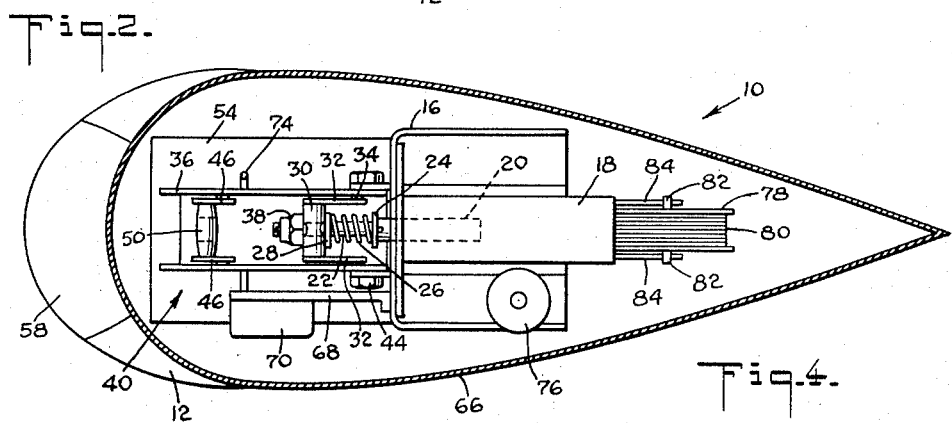
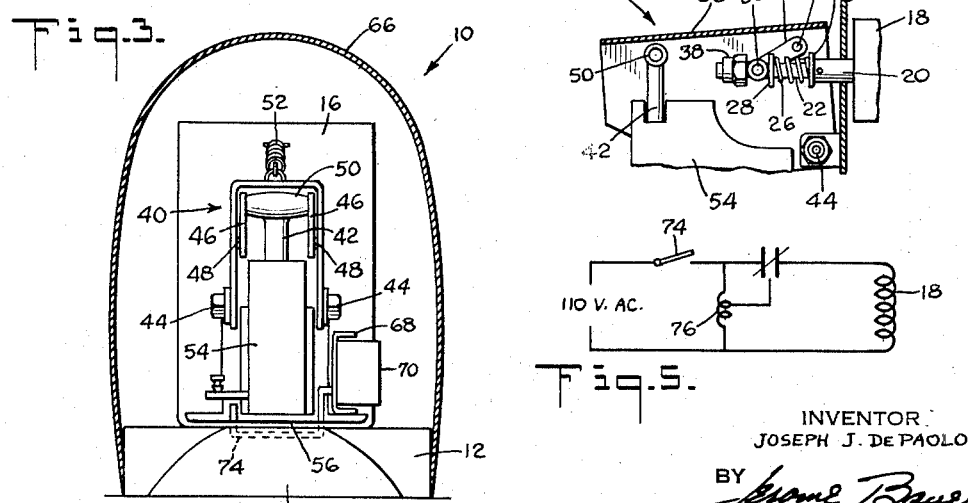
INVENTOR.
JOSEPH J. DE PAOLO
BY
ATTORNEY United States Patent Office 2,910,700
Patented Nov. 3, 1959

2,910,700

POWER OPERATED SECURING DEVICE

Joseph J. De Paolo, Brooklyn, N.Y., assignor to De Paolo-Fletcher, Inc., Mineola, N.Y., a corporation of New York Application September 25, 1956, Serial No. 611,978

8 Claims. (Cl. 1—101)

This invention relates to securing devices such as staplers, fasteners and the like, and more particularly to securing devices that are electric power operated.

It is the purpose and object of the invention to provide a securing device that automatically secures together a sheaf of material, such as papers inserted thereinto, as by stapling or other suitable fastening means, without further manipulation on the part of the operator, thereby requiring but one hand of the operator to carry out the securing function, while the operator's other hand is free to accomplish whatever other extrinsic functions are desired.

It is an object of the invention to provide a securing device that is so simple in structure and operation as to obviate the need for special skills or aptitudes on the part of the operator.

It is also an object of the invention to provide a securing device that, although it is small and compact and susceptible of being placed on a desk or table for immediate use, it also is subject to long periods of use without the need to frequently reload the same with staples or other fastening elements.

In carrying out the above objects, an immediate novel and unique feature of the invention resides in the actuator mechanism that, in spite of its compactness, is unusually efficient in operation. The compact actuator structure thereby enables the provision of an unusually large and long-lasting wire reel from which staples or fastening elements are formed automatically beneath a ram. The use of the wire reel thereby eliminates the use of preformed staples or fastening elements and the cumbersome frequent loading of such elements into securing devices known heretofore.

It is another object of the invention to provide an actuator which transmits movement to a ram from an electrically operated plunger disposed in the plane normal to the ram. Once again, a feature resulting from the novel actuator is the reduction in size of the overall securing device, inasmuch as motion is thus transmitted between two elements, each of which in a plane that is normal or perpendicular to the other.

Still another object of the invention is to provide a securing device wherein the securing mechanism thereof will perform but a single securing operation on the sheaf of material inserted thereinto.

Other and further objects of my invention reside in the structures and arrangements hereinafter more fully described with reference to the accompanying drawings in which:

Fig. 1 is a side elevation in section, of the securing device in accordance with the teaching of the invention, Fig. 2 is a top view of the securing device shown in Fig. 1, with parts thereof removed to disclose the pertinent working portions of the same, Fig. 3 is a front elevation of the securing device with a portion thereof removed, Fig. 4 is a partial view of the actuating mechanism, and Fig. 5 is a schematic view of the electrical circuit of the securing device.

Referring now to the drawings, the securing device is generally identified by the numeral 10. Securing device 10 comprises a base 12 having an anvil 14 fixed therein at the forward portion thereof.

Mounted in upright position on the base 12 is a bracket 16. Fixedly secured to the rear of the bracket 16 is an electro-magnet 18 having an armature 20. The armature 20 is movable in response to the energization of the electro-magnet 18. The armature 20 extends through and beyond the bracket 16 and is guided for reciprocating movement therein in response to the operation of the electro-magnet 18 that moves the armature outwardly or to the left thereof as seen in Figs. 1, 2 and 4.

Armature 20 is provided with a narrowed shank 22 supporting a washer 24 located at one end thereof against an enlarged shoulder of the armature and held against the shoulder by a spring 26 also circumposed about the narrowed shank 22. The other end of the spring 26 bears against a second washer 28. The combination of the spaced washers 24 and 28, and the spring means 26 therebetween, defines a snubber arrangement, the purpose of which will become more apparent as the description proceeds.

Slidably mounted on the narrowed shank 22 is a yoke 30 that is pivotally connected at its opposite and lateral ends to a pair of laterally spaced links 32. The links 32 have their upper ends pivoted as at 34 to an actuatable lever 36. The yoke 30 is retained on the narrowed shank 22 of the armature 20 by the positioning of a nut 38 that is threaded on the forward working end of the plunger.

The actuatable lever 36 comprises but one element of an overall actuating structural mechanism generally identified by the numeral 40. The actuating structural mechanism 40 serves to interconnect a vertically disposed reciprocating ram 42 with the reciprocating armature 20 that is positioned substantially normally thereto of the electro-magnet 18. As the description proceeds, it will be recognized that the perpendicularly arranged reciprocating ram 42 and electro-magnet 18 and its armature 20, are interconnected to transmit movement from the latter operator to the former ram by way of the mechanism 40.

The lever 36 included in the actuating mechanism 40 is fixedly pivoted at its lower right hand end 44 to the bracket 16. The lever 36 has a pair of laterally spaced links 46 pivoted thereto at its forward operating portion. The links 46 are pivoted at 48, at their lower ends, to the lever 36 below the plane of reciprocating movement of the armature 20 and serve to interconnect the lever 36 with the ram 42 by way of a pivotable ram yoke 50. The interconnecting ram links 46 have a normal planar position disaligned with the ram and are movable by the pivoting of the actuating lever 36 to a position of planar alignment with said ram. This movement will be clarified at a further point in the description.

Included in the actuating mechanism 40 is a yieldable or resilient member 52. The member 52 is shown in the drawings in the form of a spring that is connected at its upper end to a hook provided on the bracket 16 and at its lower end to the forward portion of the lever 36 at a point that is substantially in vertical planar alignment with the reciprocating ram 42. The resilient member 52 serves to constantly resist pivoting movement of the actuating lever 36 and the remaining structure of the actuating mechanism 40. It resists the thrust of the armature 20 and the pivoting movement that it imparts to the actuating mechanism 40, and also, as it will appear to those who are conversant with the art, it serves to return the ram 42 to its normal upward position wherein the same is removed from securing cooperation with the anvil 14 disposed in vertical alignment therewith.

The ram 42 is guided in a housing 54 in which there is also contained guiding mechanisms (not shown). The ram 42, guided in the housing 54, is accurately located for cooperation with the fixed anvil 14 that is set in alignment therebeneath. The ram and anvil, when in their separated non-securing position as shown in Fig. 1, define a pathway 56 in which a sheaf of material such as papers may be received for securement.

The entrance to the pathway 56 is widened by tapering downwardly the forward end 58 of the base 12. A torsionally acting depressor 60, secured at its back or rear end 62 to the housing 54, serves to press upon the material that is inserted and moved into the pathway 56. The forward end of the depressor 60 is tapered upwardly as at 64, to cooperate with taper 58 of the base 12 to provide the entranceway of the pathway 56.

The taper 64 of the depressor 60 bears against an inner surface of an overall removable teardrop shaped cover 66. The result is a depressor 60 that is pivotally connected at its rear end to the housing member 54, while the forward portion thereof is permitted substantial freedom of movement to torsionally bear upon material inserted into and moved along the pathway 56, thereby applying a retaining compressing force on such material.

Mounted on and extending forwardly of the bracket 16 is an extension arm 68 on which is mounted on electrical switch 70. The electrical switch 70 is secured to the extension arm 68 for longitudinal adjustment therealong, relative to a slot 72 provided therein. Adjustment of the switch 70 relative to the arm 68 may be accomplished from outside the cover 66 by an opening that may be conveniently provided therein. The switch 70 has a switch lever 74 that extends downwardly therefrom and into the pathway 56. In the drawings the switch lever 74 is shown as substantially U-shaped, having its upstanding legs passing in a vertical manner through the pathway 56 for engagement with material inserted into the pathway and for pivoting operation thereby to close its contact.

By permitting the switch 70 longitudinal adjustment relative to the arm 68 along the slot 72 defined therein, the relative location of the switch lever 74 within the pathway 56 will predeterminately control the operation of the ram 42 and the relative position of the securing or fastening means that is subsequently inserted into the sheaf of materials moved into the pathway.

Referring now to Fig. 5, it will be noted that the closing of the switch 70, upon pivoting of the lever 74, closes a circuit to the electro-magnet 18, thereby rendering the same operative and energizing it to move the armature 20 forwardly and outwardly of the same into the position as shown in Fig. 4. At the same time that the electro-magnet 18 is energized, a switch relay 76 included in the circuit, is also energized. Switch relay 76 is a time delay mechanism that is preset to automatically open the circuit to the electro-magnet 18 after the ram 42 has performed its first reciprocating securing cooperating operation with the anvil 14.

Mounted on the base 12 at the rear or back of the electro-magnet 18 is a reel 78 that has a multiplicity of turns of securing wire 80 wound about its spool. The wire 80 is threaded from the reel 78 through the guiding mechanism of the housing 54 previously described, to pass under the ram 42 and between it and the cooperating anvil 14 when the ram is in its raised position. Wire 80 may thus be formed into staples during each reciprocating movement of the ram into its cooperation with the anvil 14. Inasmuch as the guiding mechanism contained in the housing 54 does not form any part of the invention, the details of the same are not set forth herein.

In operation, the reel 78 is mounted for rotation in an opening 82 in laterally spaced arms 84. The arms 84 are fixedly secured, as at 86, either to the bracket 16 or the base 12. The wire 80 is rotated off the reel 78 and threaded through the guiding mechanisms of the housing 54 to its position beneath the ram 42. Upon the insertion of a sheaf of materials, as paper, in the pathway 56, the switch lever 74 will be pivoted, thereby triggering the switch means 70, closing a circuit to the time delay relay 76 and also to the electro-magnet 18.

The circuit thus closed by the triggering of the switch 70 serves to energize and render the electro-magnet 18 operative. The armature 20 of the electro-magnet 18 is thus actuated outwardly from the electro-magnet 18 into the extended position as is shown in Fig. 4. During the outward movement of the armature 20, the snubber structure 24, 26 and 28 yieldingly urges the yoke 30 along with the armature 20, but at the same time permits the yoke to move relatively to the narrowed shank 22.

Forward movement of the yoke 30 causes the links 32 to move with the shank 22, thereby pivoting the lever 36 about its lower pivot 44. The lever 36 is thus pivoted in opposition to the resilient member 52 which, although it resists the pivoting of the lever 36, is not sufficiently strong to overcome the force of pivoting movement imparted to the lever by the armature 20. As the lever 36 pivots, the pivot point 34 of the link 32 moves forwardly and upwardly describing a short arc, while the forward ram links 46, also being caused to pivot with the lever 36, move from their disaligned planar position into a position of substantially vertical planar alignment with the ram 42.

Continued pivoting of the lever 36 imparts a vertical downward force to the ram 42. As the ram 42 moves downwardly into cooperation with the anvil 14, it cuts a portion of the wire 80 threaded therebeneath, and forces it into securing engagement with the sheaf of materials, as paper, that is located in the pathway 56.

Normally, when paper is positioned in the pathway 56 against the now pivoted switch lever 74, the electro-magnet 18 generally receives operating impulses to continuously reciprocate the ram 42. In the instant invention, this continued reciprocation is eliminated by the provision of the time delay relay 76. The time delay relay 76 is energized at the same time as the electro-magnet 18, and is so timed that after the ram 42 has performed its first downward reciprocation, the delay mechanism of the relay 76 opens the circuit to the electro-magnet 18, thereby rendering the same inoperative. Hence, if it is desired to once again cause the ram 42 to reciprocate, it is necessary to remove the sheaf of papers from the pathway and from against the pivoting switch lever 74 and thence perform a new pivoting of the lever 74.

After the ram 42 has moved into its securing cooperation with the anvil 14, such as staple forming cooperation with the anvil, it is returned upwardly to its normal position as is shown in Fig. 1, by the return means 52 acting on the lever 36. The return means 52 forming a part of the actuating structural mechanism 40, may be relocated in position for operation directly upon the ram 42. Hence, for example, it may be so positioned as to apply a constant returning force to the ram yoke 50.

The link connection 32 between the lever 36 and the armature 20 may be defined as a lost motion connection. Although the yoke 30 is caused to move with the outward movement of the armature 20, it is also permitted relative movement to the armature 20 by virtue of the resilient end of the snubber structure 24, 26 and 28. This snubber arrangement thus creates a biasing force on the yoke 30, causing it to move with the armature during its outward operating movement, but also at the same time permits the yoke to move relatively to the armature. Hence, it will be seen that the snubber provides for take-up and possible wear on the actuator mechanism 40, permitting the actuator mechanism lost motion connection with the armature 20.

It will be readily recognized by those who are familiar with the art, that by the provision of a reel 78 containing a continuous length of securing staple wire 80, there is thus eliminated the necessity of frequent reloadings of the securing device 10 with rows of staples. The reel 78, being so positioned rearwardly of the electromagnet 18, and being threaded by generally conventional means in the housing 54 to the ram 42, may be of enlarged size, thus providing a more efficient and longer lasting securing device.

When it is desired to reload the device 10 with an additional reel of stapling wire 80, it is merely necessary to remove the cover 66 from about the base 12. The old reel 78 may then be removed from the arms 84 and a new reel substituted in its place by merely threading the new wire through the housing 54, thereby eliminating the former requirement of a mechanically skilled operator.

While there have been shown and described and pointed out the fundamental novel features of the invention as applied to a preferred embodiment thereof, it will be understood that various omissions and substitutions and changes in the form and details of the device illustrated and in its operation may be made by those skilled in the art, without departing from the spirit of the invention. It is the intention, therefore to be limited only as indicated by the scope of the claims appended hereto.

I claim:

1. A stapler comprising, in combination, a base including an anvil, a vertically movable ram cooperating with said anvil and defining a work receiving pathway therewith, a wire reel mounted on said base having the wire thereof threaded for movement beneath said ram and between said ram and anvil, substantially horizontally disposed electro-magnetic means mounted on said base, switch means in said pathway actuated by work moved thereinto to operate said electro-magnetic means, said switch means including means to render said electro-magnetic means inoperative after a single operation of said ram, an armature in said electro-magnetic means and movable thereby upon its operation, lever means movable relative to and with said armature, pivoted link means interconnecting said lever with said ram and armature, and snubber means having resilient means operable on said link means interconnecting said lever with said armature to move the same with and in response to the movement of said armature.

2. In a securing device having a work receiving pathway defined between an anvil and a securing ram movable in a vertical plane, means movable in a plane normal to said ram, a pivotable lever, link means pivoted on said lever and interconnecting the same with said ram and movable means, and lost-motion means on said movable means to move with said movable means said link means interconnecting said lever with said movable means.

3. In a material securing device, an anvil, a ram operable in a vertical plane, a material receiving pathway defined between said anvil and ram, a wire reel having the wire thereof threaded for movement beneath said ram and between said ram and anvil, a base on which said anvil and reel are mounted, electrical means in said pathway rendered operative by the movement of material therein, means responsive to the operation of said electrical means and movable in a plane normal to said ram, lever means disposed normally perpendicular to said ram, means defining a lost-motion connection between said movable means and said lever means and link means connecting said ram and lever means.

4. In a securing device having a reciprocating ram, means operable to cause said ram to reciprocate into securing position, a lever having a pivot, biased lost motion means including a connecting link between said operable means and lever, link means connecting said ram with said lever, and means resisting reciprocation of said ram into its securing position.

5. In a securing device, a ram movable to and from securing positions, an armature operable to cause said ram to move to its securing position, lever means, a fixed pivot for said lever means, link means connecting said lever means with said ram, second link means movable relative to said armature and interconnecting the same with said lever means, means on said armature yieldably cooperating with said second link means to move the same with said armature, and means cooperating with said lever to return said ram from its securing position.

6. In a securing device, a ram movable between setting and rest positions in a predetermined plane, first means to cause said ram to move to its setting position, a lost-motion connection, lever means having a fixed pivot and connected by said lost-motion connection to said first named means for pivoting movement thereby, and link means connecting said lever means with said ram and movable by the pivoting movement of said lever means to move said ram to its setting position.

7. In a device as in claim 6, said link means having a normal planar position disaligned with said ram and movable by the pivoting of said actuator means to a position of planar alignment with said ram.

8. In a stapler, an anvil, a staple forming ram normally spaced from said anvil, a wire reel having the wire thereof threaded for movement beneath said ram and between said ram and anvil, a base on which said anvil and reel are mounted, electro-magnetic means having an armature movable in a plane normal to said ram, actuator means interconnecting said armature and ram to move the latter toward said anvil upon the operation of said electro-magnetic means, said actuator means including link means and spring means movably mounted on said armature to define a lost-motion connection therewith, pivoted lever means connected with said link means and pivoted thereby in response to the movement of said armature and link means connecting said lever and ram to move said ram in response to the pivoting of said lever; switch means, an electrical circuit connecting said switch means with said electromagnetic means, said switch means being responsive to the movement of work between said ram and anvil to close said circuit to said electro-magnetic means and render the same operative, and further switch means in said circuit operative upon the closing of said circuit to said electro-magnetic means to render said electro-magnetic means inoperative after said ram has moved toward said anvil.

References Cited in the file of this patent

UNITED STATES PATENTS

| | | |
|---|---|---|
| 556,657 | Baird | Mar. 7, 1896 |
| 1,637,357 | Svenson | Aug. 2, 1927 |
| 1,940,980 | Svenson | Dec. 26, 1933 |
| 2,272,533 | Svenson | Feb. 10, 1942 |
| 2,381,075 | Nelsen | Aug. 7, 1945 |
| 2,399,575 | Schleicher | Apr. 30, 1946 |
| 2,403,947 | Oussani | July 16, 1946 |
| 2,459,313 | Franz | Jan. 18, 1949 |
| 2,574,811 | Blumensaadt | Nov. 13, 1951 |
| 2,643,307 | Geel | June 23, 1953 |
| 2,698,159 | Crum | Dec. 28, 1954 |